United States Patent [19]

Katz et al.

[11] Patent Number: 4,792,456

[45] Date of Patent: Dec. 20, 1988

[54] ACCELERATED PROOFING OF REFRIGERATED DOUGHS

[75] Inventors: Edward Katz; Douglas A. Edmonson, both of St. Louis County, Mo.

[73] Assignee: Anheuser-Busch Companies, Inc., St. Louis, Mo.

[21] Appl. No.: 922,524

[22] Filed: Oct. 24, 1986

[51] Int. Cl.$^4$ ............................................. A21D 10/00
[52] U.S. Cl. .................................... 426/551; 426/94; 426/99; 426/128; 426/241; 426/412; 426/512; 426/520; 426/524
[58] Field of Search ............... 426/128, 241, 412, 520, 426/524, 549, 551, 561, 562, 94, 99, 512

[56] References Cited

U.S. PATENT DOCUMENTS

| | | | |
|---|---|---|---|
| 3,170,795 | 2/1965 | Andre | 426/551 |
| 3,275,450 | 9/1966 | Holstein | 426/551 |
| 3,397,065 | 8/1968 | Cunningham et al. | 426/128 |
| 3,649,304 | 3/1972 | Fehr, Jr. et al. | 426/128 |
| 4,393,084 | 7/1983 | Pomper et al. | 426/551 |

*Primary Examiner*—R. B. Penland
*Attorney, Agent, or Firm*—Gravely, Lieder & Woodruff

[57] ABSTRACT

A process for accelerating the proofing of chemically leavened dough when the ambient temperature is below 70° F. by heating the dough in a proofing tunnel until the average dough temperature is about 80°–90° F., allowing the dough to develop about 10 psi pressure, and refrigerating the dough in a sealed container so that the internal pressure reaches about 20 psi. A modification using palm oil encapsulated glucono-delta-lactone acidulant and sodium bicarbonate as the chemical leavening system allows the dough to be refrigerated immediately after it leaves the proofing tunnel and still develop 20 psi internal pressure in the dough container.

14 Claims, 1 Drawing Sheet

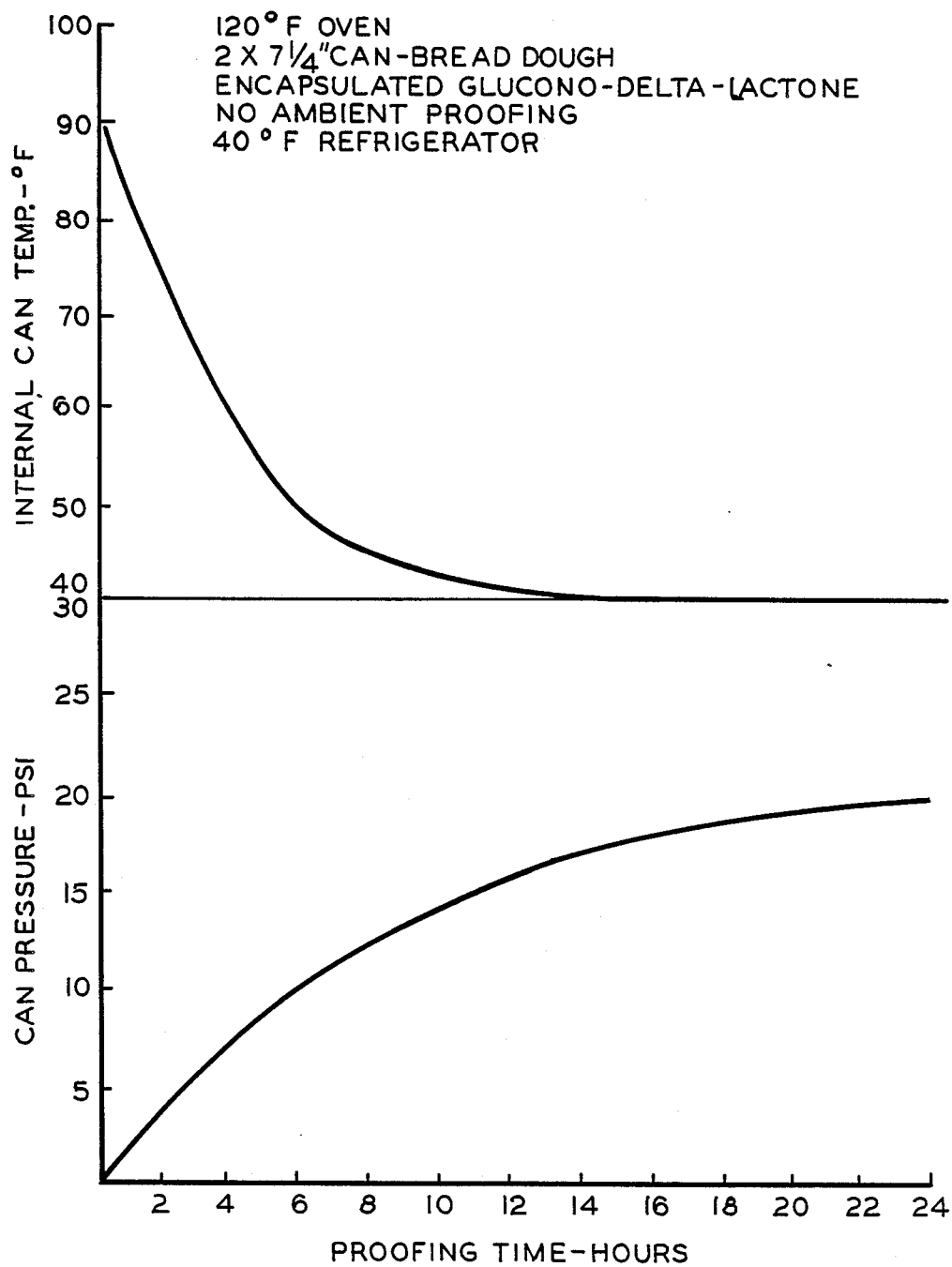

ACCELERATED PROOFING OF REFRIGERATED DOUGHS

BACKGROUND OF THE INVENTION

This invention relates to the field of refrigerated dough products and, in particular, it relates to processes and equipment for the accelerated proofing of the uncooked dough before the container in which it is stored is refrigerated. With the present process, the dough can be proofed either before or after it is sealed in its container.

The commercial refrigerated dough products which are the subject of this invention are formulated with a chemical leavening agent known in the trade as baking soda. This leavening agent may be encapsulated or in the free form depending on the product.

The chemical leavening agent proofs the product in the can by releasing $CO_2$ and expanding the dough to seal the can. The proofing of the dough in the can before refrigeration is necessary to avoid development of pyrophosphate crystals which look like glass. Proofing also seals the can to maintain a positive pressure in the can after refrigeration. Conventionally, it is preferred that a pressure of at least 10 psi be developed in the can before refrigerating the can so that an eventual pressure of approximately 15-20 psi will be in the can after refrigeration, i.e., when the can is on the grocer's shelf or in the consumer's hands.

During the summer months when ambient temperatures are 80°-100° F. in the plant, proofing normally takes less than 6 hours. However, in the winter months when inside ambient temperature is 60°-70° F., proofing may take up to 24 hours or even longer, depending on the product and the ambient air conditions. In any case, product can not be moved under ambient proofing to the refrigerator until a can pressure of at least 10 psi has been achieved on the proofing floor. If the product is refrigerated before 10 psi is generated, the desired final pressure is not developed in the refrigerator.

The two products that give the most proofing problems are refrigerated dough that is made into a "small" bread loaf and bread sticks. Other types of products which require proofing are biscuits, crescent rolls and cinnamon rolls.

A principal object of this invention is to accelerate the proofing time at 60°-70° F. ambient temperatures to less than 6 hours, which is equivalent to proofing time under hot summer conditions.

We have developed a process using a proofing tunnel where the raw dough is heated until the temperature of the dough is about 80°-90° F. which accelerates the proofing so that it is equivalent to hot summer proofing conditions, even when the ambient temperature is below about 70° F.

Surprisingly we also have found that using a preferred chemical leavening system, we can move the product directly into the refrigerator from the proofing tunnel without a floor holding period, thus eliminating double handling of the product and saving floor space in the plant.

Heretofore, production of $CO_2$ has been slowed or stopped when the product is moved into the refrigerator, unless a pressure of at least 10 psi had been developed prior to refrigeration.

We have found that by using encapsulated glucono-delta-lactone and regular baking soda as a chemical leavening combination we are able to heat the dough in a proofing tunnel to 80°-90° F. and then immediately move the dough into a refrigerator and it still will develop the desired container pressure of about 20 psi.

Faster proofing is desired to retard microbiological growth and improve shelf life of the product and to optimize product quality.

These and other objects and advantages will become apparent hereinafter.

SUMMARY OF THE INVENTION

This invention comprises a process for rapidly proofing chemically leavened dough which is to be refrigerated and specifically relates to the accelerated proofing of dough when the ambient conditions are unfavorable for such proofing. In the process the temperature of the dough is raised to about 80°-90° F. prior to refrigerating the dough for shipping and storage. This causes the dough to discharge $CO_2$ and to develop a desired pressure in the container in which it is or will be packed. When a chemical leavening agent combination of encapsulated glucono-delta-lactone and normal baking soda are utilized, the heated dough can be moved directly into the refrigerator with holding and it still will develop the desired 20 psi internal pressure in the package.

DESCRIPTION OF THE DRAWING

The drawing is a graphical representation of the results from moving bread dough from preproofing directly into a refrigerator when encapsulated glucono-delta-lactone and sodium bicarbonate is the chemical leavening system.

DETAILED DESCRIPTION

We have developed two methods for proofing dough before it is refrigerated. The first involves heating the individual flat dough pieces before they are packed and sealed into a container. The second involves packing and sealing the dough in its container and then heating in a tunnel oven. We have utilized different ovens, including a jet sweep oven, a forced convection oven, and a no convection oven.

In all methods, the object of the invention is to heat the dough to a temperature of about 80°-90° F., preferably 85°-88° F. The temperature ranges apply whether the dough is heated before being placed in its container or is heated inside its sealed container.

If the dough temperature is substantially higher than 90° F., the dough is damaged with no improvement in proofing. For economic reasons, it is desired to heat the dough as rapidly as possible to minimize equipment size and holding capacity. However, if one heats the dough at too high a temperature, problems are created. One of these is the formation of a brownish color on the outside of the dough. Another is the creation of a large temperature gradient across the dough which means the inside dough is too cool to be properly proofed and the outside dough is damaged because it is too warm. If the overall dough temperature is too high (above about 90° F.) the dough is damaged with no improvement in proofing.

This invention not only defines the required internal dough temperature in the can for accelerated proofing, but also defines the optimum external heating temperature. If these conditions are not followed an unacceptable product is produced.

LEAVENING SYSTEM

The leavening system is a combination of glucono-delta-lactone and sodium bicarbonate. One of the components is coated with a partially hydrogenated vegetable oil, preferably, palm oil. Suitable systems include DURKOTE GDL and plain sodium bicarbonate and DURKOTE Sodium Bicarb 335-70 and uncoated glucono-delta-lactone.

The DURKOTE products are made by Durkee Industrial Foods of Cleveland, Ohio.

Glucono-delta-lactone is an inner ester of gluconic acid. When it hydrolyzes, gluconic acid is formed and this reacts with soda.

The preferred encapsulated glucono-delta-lactone comprises by weight 48–72% glucono-delta-lactone, coated with 28–52% partially hydrogenated palm oil. The coating melts at 97°–143° F. and the material is in the form of a free flowing white powder of which a maximum of 2% is retained on 10 mesh and a maximum of 10% passes through 140 mesh.

EXAMPLE NO. 1

DOUGH PIECES HEATED BEFORE BEING PLACED IN CANS

High intensity radiant heaters with current density up to 20 watts/in$^2$ are used. The ¼" thick flat dough pieces are kept under the heaters at 1" to 2" distance from the top of the dough piece to the heater. At 1" it took about 5 seconds to get 18° F. dough temperature rise from 68° F. to 85° F. and at 2" height it took 7–13 seconds or an average of about 10 seconds.

This pad heating is very time-temperature sensitive and close control of temperature with venting of excess heat is necessary to avoid overheating dough.

Higher dough temperatures (over 90° F.) showed some discoloration of the dough toward the warm surface. Temperatures about 90° F. also take longer to cool during the refrigeration cycle. In some cases the higher temperatures resulted in slower proofing rates. This is attributed to probably premature loss of $CO_2$ gas. Overheating of dough also may expand the dough so that it does not fit well into cans.

An advantage of this heating system is that it is very fast.

Wattage Range: 10–40 watts/in$^2$
Preferred Wattage: 20 watts/in$^2$
Distance of Heaters to Top of Dough: ¼"–12"
Preferred Range: 1"–2"
Retention Time for 10°–20° F. Temperature Rise
Range at 1" distance: 3–7 seconds
Preferred Range: 4–5 seconds
Range at 2" distance: 4–14 seconds
Preferred Range: 8–12 seconds

EXAMPLE NO. 2

HEATING TUNNEL-DOUGH FILLED CANS

The air temperature in the heating tunnel may be between about 90°–200° F. with a preferred range of about 110°–130° F. and an optimum temperature of 120° F.

Lower air temperatures require too long a retention time for the dough in the tunnel and too large a tunnel oven to reach desired dough temperature range.

Higher air temperatures heat the dough faster but create a problem in that the outside dough gets discolored, that is, it turns a pale brown which is unattractive to the consumer.

Higher air temperatures also create a large temperature gradient across the dough. The outside dough is too warm and the inside dough is too cool. If the dough temperature is too high, it damages the dough with no improvement in proofing.

It is desired to keep the average dough temperature below 90° F. an any particle of the dough below 120° F.

Using a no convection tunnel and canned bread dough, we use a chemical leavening agent which can be either encapsulated baking soda and plain GDL (an acidulant) or encapsulated GDL and plain (unencapsulated) baking soda. Either combination is satisfactory. Other doughs, such as bread sticks, biscuits, dinner rolls and breakfast rolls also can be used in place of bread.

Under those conditions, starting from a dough temperature of 70° F., Table No. 1 shows the retention time and heating air temperatures to reach 87° F.

TABLE NO. 1

| Oven Temp. | Minutes |
| --- | --- |
| 100° F. | 60–80 |
| 120° F. | 25–45 |
| 135° F. | 15–25 |
| 150° F. | 10–15 |
| 180° F. | 8–14 |
| 250° F. | 3–6 |

We fuund 120° F.±10° F. to be the optimum oven temperature for acceleration of proofing. Higher heating temperatures (>135° F.) caused some damage to the dough in the can, thus reducing overall product quality.

Jet Sweep Oven

This oven uses 20–30 mile/hr. velocity out of hundreds of jets. Table No. 2 shows temperature and times for cans standing up as they passed through the jet swept oven.

TABLE NO. 2

| Approx. Retention Time Range To Reach 87° F. Dough Temp. Starting at 70° F. Dough Temp. | |
| --- | --- |
| Oven Temp. | (Minutes) |
| 100° F. | 18–22 |
| 120° F. | 15–19 |
| 150° F. | 8–11 |
| 200° F. | 5–7 |

Again we found that about 120° F. is optimum air temperature.

Convection Heating Tunnel (Oven)

This is a hybrid between a no convection and a jet sweep oven. It uses recirculating air to accelerate heat transfer. An Industrial Washing Machine Hot Air Drier (typical of this equipment) was used to develop the data in Table No. 3 which shows conditions necessary to achieve 87° F. optimum dough temperatures in cans.

TABLE NO. 3

| Oven Temp. °F. | Product | Can Size | Wt. of Dough (ounces) | Retention Time Range To Reach 87° F., Starting With 70° F. Dough Temp. (Minutes) |
|---|---|---|---|---|
| 120° F. | Bread Dough | 2" dia. × 7¼" | 10 | 9–13 |
| 120° F. | Crescent Rolls | 1¾" dia. × 7" | 8 | 13–17 |
| 120° F. | Cinnamon Rolls | 2¼" dia. × 6½" | 9½ | 18–22 |
| 102° F.–105° F. | Bread Dough | 2" dia. × 7¼" | 10 | 26–29 |
| 102° F.–105° F. | Cinnamon Rolls | 2¼" dia. × 6½" | 9½ | 41–47 |

EXAMPLE NO. 3

This example illustrates the use of encapsulated glucono-delta-lactone to eliminate hold time after heating. The dough is placed directly from the proofing tunnel into the refrigerator.

The refrigerated bread dough is a conventional formula and contains a chemical leavening agent which is formulated from glucono-delta-lactone encapsulated in a vegetable oil and unencapsulated sodium bicarbonate. The acidulant is about 68–72% glucono-delta-lactone and coated with about 28–32% partially hydrogenated palm oil. The palm oil has a melting point of about 136°–143° F. The acidulant product is a free flowing white powder of which a maximum of 2% is retained on a 10 mesh screen and a maximum of 10% passes through a 140 mesh screen.

After the dough is mixed, it is formed into loaves to fit a 2" dia.×7¼" can, placed into a container of this size, and heated in a 120° F. convection tunnel until the dough temperature reaches 89° F. The containers of dough then are placed itto a case containing 12 cans, and the case is place in a 40° F. refrigerator. The internal pressure reaches 20 psi after 24 hours, whereas the internal can temperature reaches 50° F. after about 5¼ hours.

This Example is illustrated graphically in the drawing accompanying this application.

Following is a summary of the various aspects of this invention as they relate to the radiant heaters and to the different types of heating tunnels.

A. Short time heating of raw dough pieces before putting dough into can.
  1. Use high intensity radiant heater.
  2. Current Density: 10–40 watts/in$^2$
     Preferred: 20 watts/in$^2$
  3. Desired average dough temperature:
     Range: 80°–90° F.
     Preferred: 85°–88° F.
  4. Distance from top of dough to heating element.
     Range: ¼"–12"
     Preferred: 1"–2"
  5. Retention time under heater:
     Range: 3–14 seconds
     Preferred at 1" distance: 4–5 seconds
     Preferred at 2" distance: 8–12 seconds B. Heating tunnel oven - no convection
  Heat dough in sealed cans.
  Desired average dough temp.
  Range: 80°–90° F.
  Preferred 85°–88° F.
  Desired oven temp.
  Range: 110°–130° F.
  Preferred: 115°–125° F.
  Retention time at 120° F. (Bread dough)
  2" dia.×7¼" can (10 oz. dough)
  Desired range: 25–45 minutes
  Preferred: 30–35 minutes C. Jet Sweep Oven
  Heat dough in sealed cans.
  Desired average dough temp.
  Range: 80°–90° F.
  Preferred: 85°–88° F.
  Preferred oven temp.
  Range: 110°–130° F.
  Preferred: 115°–125° F.
  Retention time at 120° F. oven temperature for bread dough: 15–19 minutes D. Convection oven
  Heat dough in sealed cans
  Desired average dough temp.
  Range: 80°–90° F.
  Preferred: 85°–88° F.
  Desired oven temp.
  Range: 110°–130° F.
  Preferred: 115°–125° F.

| Retention time at 120° F. oven temp. | Minutes |
|---|---|
| Bread dough 2" dia. × 7¼" can (10 oz.) | 9–13 |
| Crescent rolls 1¾" dia. × 7" can (8 oz.) | 13–17 |
| Cinnamon rolls 2¼" dia. × 6½" can (9½ oz.) | 18–22 |

This invention is intended to cover all changes and modifications of the example of the invention herein chosen for purposes of the disclosure which do not constitute departures from the spirit and scope of the invention.

What is claimed is:

1. A method of accelerating the proofing of raw dough products containing a chemical leavening system consisting of a particulate acidulant component and a particulate component which produces $CO_2$ when contacted by the acidulant component and in which the particles of one of the components are encapsulated to minimize premature reaction between the components, which raw dough products are to be stored in sealed containers and refrigerated comprising the steps of:
   (a) forming the dough product at a forming temperature of not more than about 70° F. at which proofing of the dough product is suppressed,
   (b) placing the formed dough product in a container and artificially heating the container with a heat source of a temperature of about 110°–130° F. until the formed dough product in the container attains an average temperature of about 80°–90° F.,
   (c) proofing the dough within the container at the average temperature until the container is internally sealed by the proofing of the dough product and the internal pressure reaches at least about 10 psi in the container, and
   (d) refrigerating the heated dough product in the internally sealed container.

2. The method or claim 1 wherein the dough is heated to an average temperature of about 85°–88° F.

3. The method of claim 1 wherein the container is heated by being passed through a tunnel in which the tunnel temperature is about 120° F.

4. The method of claim 1 wherein the chemical leavening system is a mixture of glucono-delta-lactone acidulant and sodium bicarbonate, one of which is encapsulated with a vegetable oil.

5. The method of claim 4 wherein the vegetable oil is palm oil.

6. The metod of claim 1 where the heated dough product contained in the sealed container is moved directly from the area where it is heated into refrigerated storage with substantially no hold at ambient temperature.

7. The method of claim 6 wherein the chemical leavening system is a mixture of glucono-delta-lactone acidulant encapsulated with a vegetable oil and sodium bicarbonate.

8. The method of claim 7 wherein the vegetable oil is palm oil.

9. The method of claim 7 wherein the glucono-delta-lactone is encapsulated with palm oil having a melting point of about 136°–143° F.

10. The method of claim 9 wherein the acidulant is a powder of about 68–72% glucono-delta-lactone and about 28–32% palm oil having a melting point of about 136°–143° F., and a maximum of about 2% is retained on a 10 mesh screen and a maximum of about 10% passes a 10 mesh screen.

11. In a method of preparing a packaged, refrigerated dough product which includes making a dough containing a chemical leavening system having one of its leavening agents encapsulated in vegetable fat, forming the dough into potential product while maintaining the temperature of the dough at no more than about 70° F., packaging the formed dough product, proofing the formed dough product within the package and then refrigerating the package with product contained therein, the improvement which comprises:

artificially heating the potential dough product from the temperature of about 70° F. and positively controlling the average temperature of the formed dough prior to refrigeration not to exceed an average dough temperature of about 90° F.

12. In a method of preparing a packaged, refrigerated dough product which includes making a dough containing a chemical leavening system having one of its leavening agents encapsulated in a vegetable fat, forming the dough into potential product while the temperature of the dough is at a low temperature at which proofing is suppressed, packaging and proofing the formed dough product, and then refrigerating the package with product contained therein, the improvement which comprises:

artificially heating the potential formed dough product from the low temperature and positively controlling the average temperature of the formed dough prior to refrigeration within the range of about 80°–90° F.

13. In a method of preparing a packaged, refrigerated dough product which includes making a dough containing a chemical leavening system having one of its leavening agents encapsulated in a vegetable fat, forming the dough into potential product, packaging the formed dough product, proofing the formed dough product, refrigerating the package with product contained therein, internally sealing the package with the formed dough product, and establishing a pressure of at least about 10 psi within the package, the improvement which comprises;

artificially heating the potential dough product from the forming temperature and positively controlling the average temperature of the dough prior to refrigeration such that the average dough temperature does not exceed about 90° F.

14. In the method as defined in claim 13 wherein the artificial heating is effected by exposing individual packages directly to an atmosphere of a temperature of 110°–130° F., and then placing a plurality of the individual packages in a packing case prior to refrigeration.

* * * * *